United States Patent
Lyle et al.

(10) Patent No.: US 9,726,252 B2
(45) Date of Patent: Aug. 8, 2017

(54) FREQUENCY ALTERING BRACE FOR AN ELECTRIC MOTOR

(71) Applicant: Nidec Motor Corporation, St. Louis, MO (US)

(72) Inventors: David M. Lyle, Glencoe, MO (US); Timothy J. Druhe, Granite City, MO (US)

(73) Assignee: Nidec Motor Corporation, St. Louis, MO (US)

( * ) Notice: Subject to any disclaimer, the term of this patent is extended or adjusted under 35 U.S.C. 154(b) by 704 days.

(21) Appl. No.: 14/103,030

(22) Filed: Dec. 11, 2013

(65) Prior Publication Data

US 2014/0167544 A1   Jun. 19, 2014

Related U.S. Application Data

(63) Continuation-in-part of application No. 13/720,450, filed on Dec. 19, 2012, now abandoned.

(51) Int. Cl.
| | |
|---|---|
| *H02K 5/24* | (2006.01) |
| *F16F 15/02* | (2006.01) |
| *F16F 15/04* | (2006.01) |

(52) U.S. Cl.
CPC ............. *F16F 15/04* (2013.01); *H02K 5/24* (2013.01)

(58) Field of Classification Search
CPC .. H02K 5/24; F16F 15/04; F16F 15/00; F16F 15/02; F16F 15/08; F16M 5/00; F16M 13/00

(Continued)

(56) References Cited

U.S. PATENT DOCUMENTS

| | | |
|---|---|---|
| 479,331 A | 7/1892 | McGregor |
| 3,127,092 A | 3/1964 | Shenberger |

(Continued)

FOREIGN PATENT DOCUMENTS

| | | | |
|---|---|---|---|
| DE | EP 2510861 A2 * | 10/2012 | ........... A47L 9/0081 |
| EP | 2 197 090 A1 | 6/2010 | |

OTHER PUBLICATIONS

Walter et al., Machine Translation of EP2510861, Oct. 2012.*

(Continued)

*Primary Examiner* — Quyen Leung
*Assistant Examiner* — Eric Johnson
(74) *Attorney, Agent, or Firm* — Maginot Moore & Beck LLP

(57) ABSTRACT

A vibration dampening brace for a motor enables altering the stiffness and reed critical frequency of a combined system of the motor and driven equipment without removal of the motor from a motor stand or support structure. The vibration dampening brace includes a first member configured to engage a portion of a housing of an electrical motor and a second member operatively connected to the first member to stiffen the bending moment of the electrical motor housing, resulting in the housing moving less with the vibrations generated by the combined system of the motor and the driven equipment. The vibration dampening brace alters the RCF of the motor system by a predetermined amount to modify the RCF of the combined system and ensure that the RCF of the combined system is outside a range of vibration frequencies that would amplify the motor vibrations.

2 Claims, 9 Drawing Sheets

(58) Field of Classification Search
USPC ...... 310/51, 157; 248/615, 638, 688, 346.04
See application file for complete search history.

(56) References Cited

U.S. PATENT DOCUMENTS

| | | |
|---|---|---|
| 3,154,704 A | 10/1964 | Shaffer |
| 3,396,665 A | 8/1968 | Berman |
| 4,019,704 A | 4/1977 | Levine |
| 4,077,233 A | 3/1978 | Hörnig et al. |
| 5,489,188 A | 2/1996 | Meyer et al. |
| 5,653,584 A | 8/1997 | Mazzucato et al. |
| 5,775,469 A | 7/1998 | Kang |
| 5,980,220 A | 11/1999 | Mazzucato et al. |
| 5,982,066 A | 11/1999 | Marracino et al. |
| 2001/0045782 A1 | 11/2001 | Lieu et al. |
| 2008/0206076 A1 | 8/2008 | Anwer et al. |
| 2009/0178892 A1 | 7/2009 | Lamers et al. |
| 2011/0278777 A1 | 11/2011 | Allaire |

OTHER PUBLICATIONS

Finley et al.; An Analytical Approach to Solving Motor Vibration Problems; IEEE/PCIC Conference Record; 1999; Paper No. PCIC-99-20; 16 Pages.

International Search Report and Written Opinion of the International Searching Authority corresponding to PCT Application No. PCT/US2013/074402, Mar. 18, 2014, 9 Pages, Korean Intellectual Property Office, Daejeon Metropolitan City, Republic of Korea.

\* cited by examiner

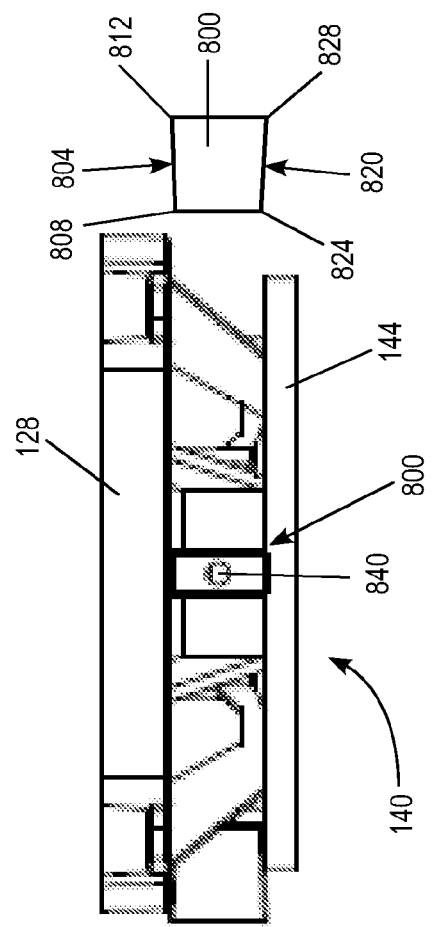
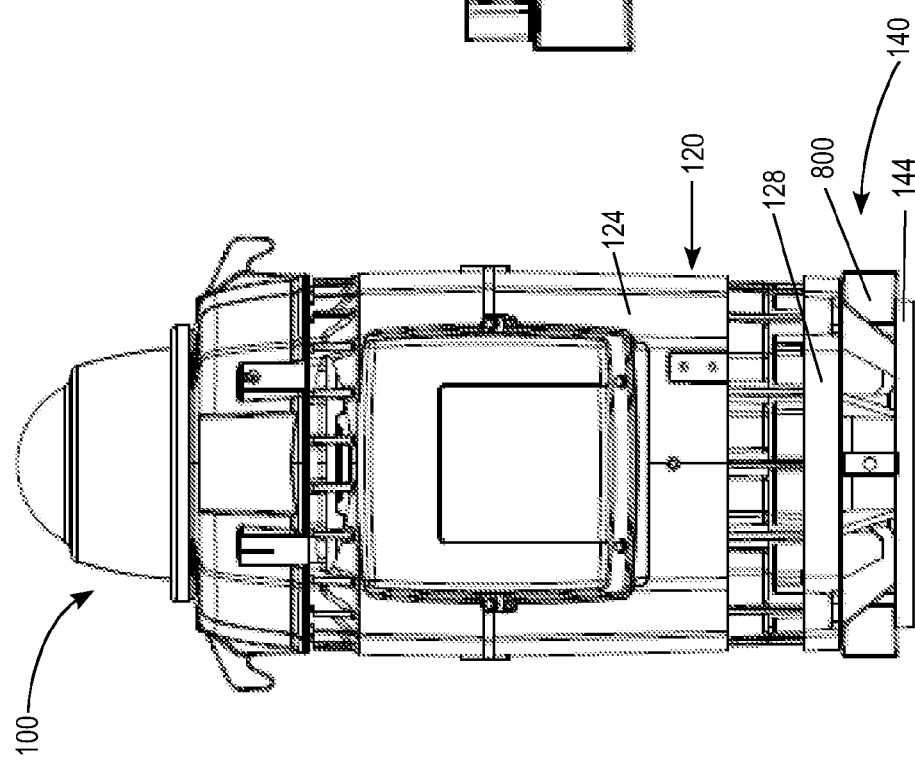

FREQUENCY ALTERING BRACE FOR AN ELECTRIC MOTOR

CLAIM OF PRIORITY

This is a continuation-in-part application of co-pending U.S. application Ser. No. 13/720,450, which is entitled "Frequency Altering Brace For An Electric Motor," and was filed on Dec. 19, 2012, the disclosure of which is hereby incorporated by reference in its entirety.

TECHNICAL FIELD

This disclosure relates generally to electric motors, and, in particular, to support braces for electric motors.

BACKGROUND

Electric motors are used in various household, office, automotive, and industrial applications. A typical electric motor includes a rotor surrounded by an electromagnet, called a stator. When varying electrical energy is applied to the stator, a magnetic field is generated that produces a torque that spins the rotor. The rotor includes an output shaft that connects to an output device, such as a pump, fan, belt, or gear, to operate the device with the rotational output of the motor. A vertically mounted electric motor is one in which the output shaft is oriented vertically to enable the output shaft to be coupled to an output device positioned above or below the motor. Vertical motors rest on a stand, which is configured to provide a stable platform for the motor and output device. Horizontally oriented motors, on the other hand, are mounted such that the output shaft extends from the motor housing horizontally and the output shaft couples to an output device located next to the horizontal motor.

During operation of an electric motor, the rotating components of the motor and the driven components generate vibrations that resonate at various frequencies. A motor and housing system has a resonance frequency (also known as a reed-critical frequency or "RCF"), which is a function of the mass, distribution of the mass, and base geometry of the motor and housing system. If the frequency of the vibrations produced in the motor and driven equipment is close to or the same as the RCF of the combined system (motor and housing plus the driven equipment), the vibrations are amplified through the combined system, generating loud noises and potentially resulting in mechanical issues with the motor and system components.

The frequency of the vibrations and the RCF can be calculated in a motor based on the operating conditions of the motor and the geometry of the motor and housing system. Thus, combined system including a motor and driven equipment is typically designed such that the system RCF is not near the vibration frequencies of the combined system. However, in some instances, issues develop after installation of a vertical or horizontal motor that arise from changed operating conditions or erroneous calculations. One solution to RCF vibration issues involves replacing the motor with a motor of a different size, which produces different vibration frequencies and has a different RCF. Another solution is to replace the motor stand, which also alters the RCF of the combined system. However, both solutions require removing the motor from the stand. Vertical and horizontal motors in industrial applications are often very large and heavy, and heavy equipment is required to remove the motor from the stand. Thus, replacing the motor or stand can be very expensive. Consequently, an improved solution to RCF vibration issues is desirable.

SUMMARY

In one embodiment a vibration dampener for an electrical motor stiffens the bending moment of a housing of an electrical motor, resulting in the housing moving less with the vibrations generated by the combined system (motor and driven equipment). The vibration dampener is configured to increase stiffness of the motor housing to alter the RCF of the motor system by a predetermined amount to ensure that the RCF of the combined assembly is outside the range of vibration frequencies generated by the combined system, avoiding amplification of vibrations. The vibration dampener includes a first member configured to engage a portion of a housing of an electrical motor and a second member operatively connected to the first member, the first and second members being configured to stiffen a bending moment of the housing to modify the resonance frequency of the electrical motor.

In another embodiment another vibration dampener for an electrical motor stiffens the bending moment of a housing of an electrical motor, resulting in the housing moving less with the vibrations generated by the motor. The vibration dampener is configured to increase stiffness of the motor housing to alter the RCF of the motor system by a predetermined amount to ensure that the RCF of the combined system is outside the range of vibration frequencies generated by the electrical motor and driven equipment, avoiding amplification of the vibrations. The vibration dampener includes a member configured to engage an electrical motor housing and a plate. The member has a first surface configured to engage a surface of the electrical motor housing and a second surface configured to engage the plate. Each of the first and second surfaces have first and second ends, and the first ends of the first and second surfaces are closer to one another than the second ends of the first and second surfaces. The first ends of the first and second surfaces are separated by a distance that is less than a distance between the electrical motor housing and the plate and the second ends of the first and second surfaces are separated by a distance approximately equal to the distance between the electrical motor housing and the plate to enable the first ends of the first and second surfaces of the member to be inserted into a space between the electrical motor housing and the plate until a portion of the member proximate the second ends of the first and second surfaces is wedged into contact with the electrical motor housing and the mounting plate to stiffen the bending moment of the electrical motor housing and modify the resonance frequency of the electrical motor.

In yet another embodiment, an electrical motor includes first and second members configured to stiffen the bending moment of the housing of the electrical motor, resulting in the housing moving less with the vibrations generated by the motor. The increased stiffness of the motor housing alters the RCF of the motor system by a predetermined amount to ensure that the RCF of the combined system is outside the range of vibration frequencies generated by the electrical motor, avoiding amplification of the motor vibrations. The electrical motor includes a stator, a rotor, a housing, a first member, and a second member. The rotor is configured to rotate with reference to the stator, and the rotor has an output shaft that rotates with the rotor in response to electromagnetic fields generated by the stator. The housing surrounds the rotor and the stator. The first member is configured to engage a portion of the housing of the electrical motor and the second member is operatively connected to the first member to stiffen the bending moment of the housing of the electrical motor to modify the resonance frequency of the electrical motor.

BRIEF DESCRIPTION OF THE DRAWINGS

FIG. 14 is a side view of a motor system having another embodiment of a vibration dampener.

FIG. 15 is a partially exploded side detail view of the vibration dampeners of FIG. 14.

DETAILED DESCRIPTION

As used herein, the term "supporting fixture" refers to a structure that supports at least a portion of the electrical motor. The supporting fixture can be a mounting plate positioned on or beneath a motor housing, a portion of the motor housing, a motor frame, a motor stand, a foundation, the ground, or another structure on which the motor is installed.

Figure 1:
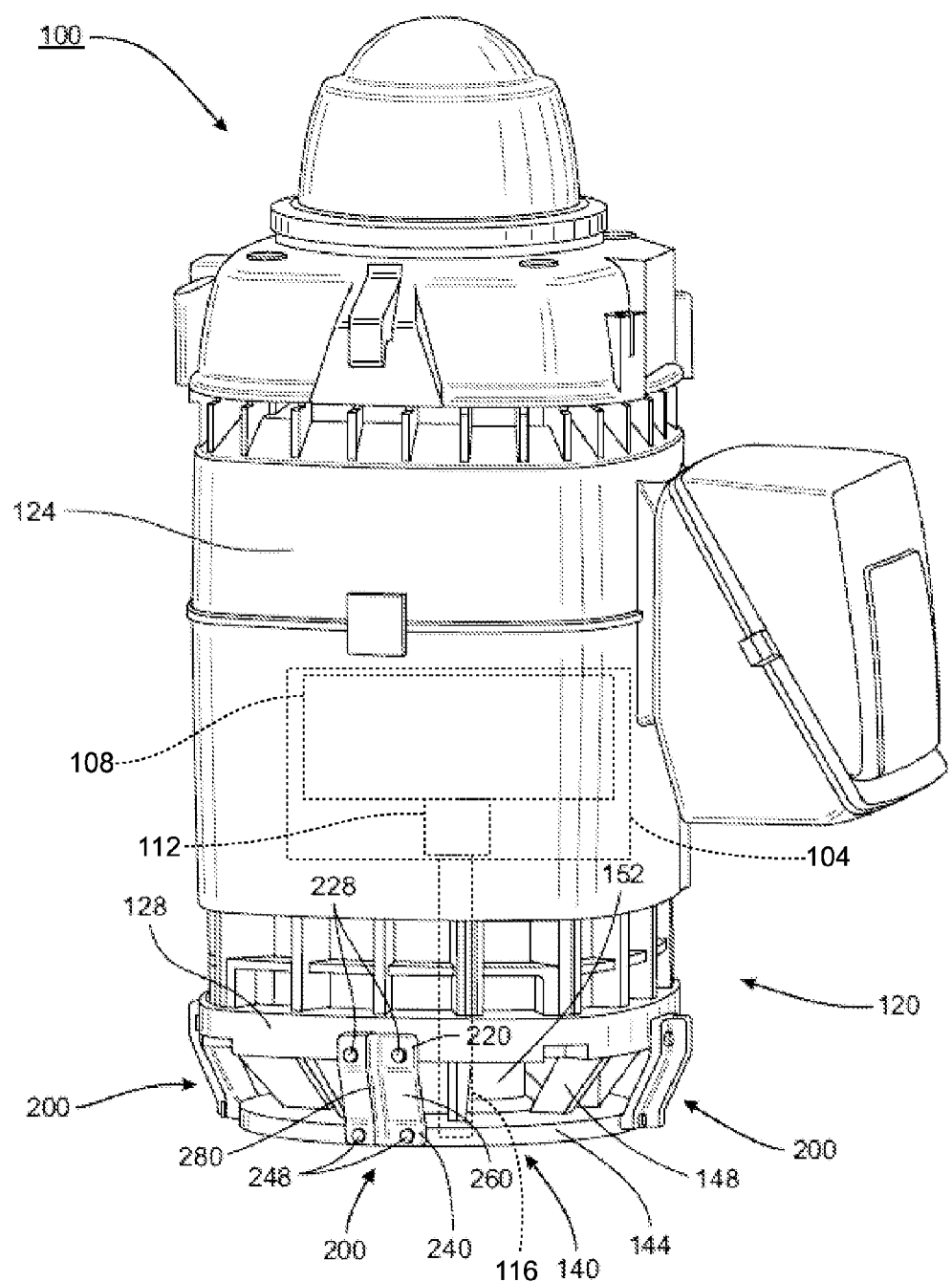
FIG. 1 is a side perspective view of a motor system having vibration dampeners.

FIG. 1 depicts a vertical motor system 100. The vertical motor system 100 comprises a motor housing 120, a motor stand 140, and a plurality of vibration dampening braces 200. The motor housing 120 includes a motor cover 124 and a housing base 128. An electric motor 104 having a stator 108, a rotor 112, and an output shaft 116 is positioned inside the motor cover 124, mounted to the housing base 128. In the embodiment of FIG. 1, the motor cover 124 and housing base 128 are sealed, and are sealingly connected to one another, to prevent debris from interfering with operation of the motor and to enable installation of the motor system 100 in hostile or outdoor environments. In other embodiments, the motor cover and base are not sealed.

The motor stand 140 includes a mounting plate 144, a plurality of fixed supports 148, and an output shaft casing 152. The motor stand 140 is configured to enable the motor system 100 to be mounted on an output device, for example a pump, to which the motor delivers rotational motion. In other embodiments, the motor stand can be configured to mount the output device to the ground or a foundation. The output shaft casing 152 surrounds the output shaft 116 of the motor in the region between the motor housing 120 and the output device. A plurality of fixed supports 148 positioned around a circumference of the motor system 100 extend from the mounting plate 144 to the housing base 128 to connect the mounting plate 144 and housing base 128 and provide structural support for the housing base 128.

Figure 2:
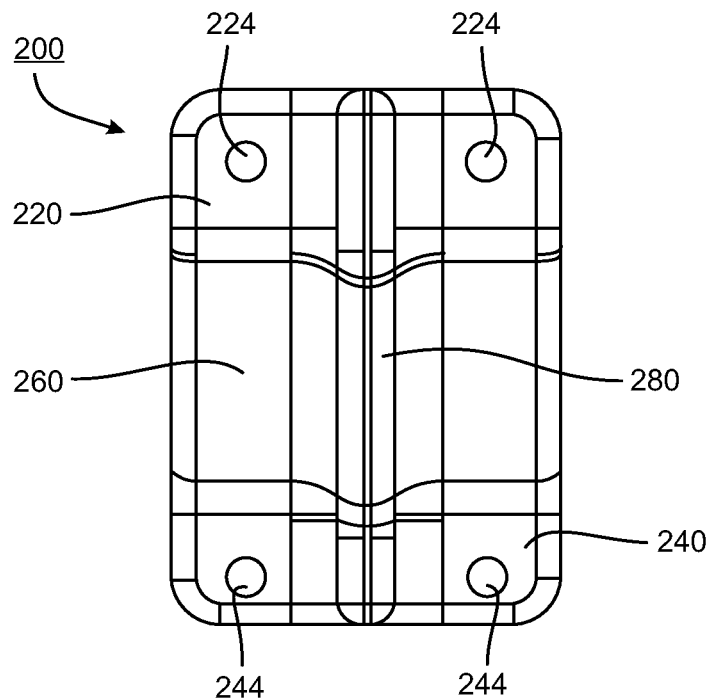
FIG. 2 is a schematic top view of the vibration dampener of FIG. 1.
Figure 3:
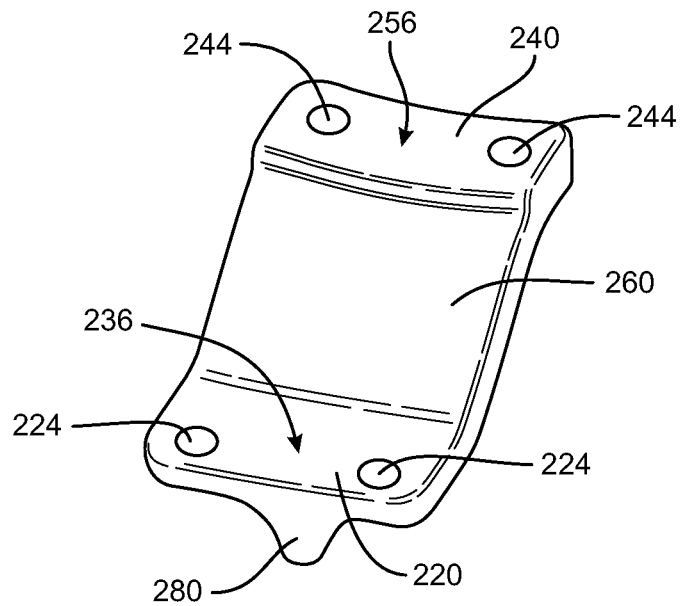
FIG. 3 is a rear perspective view of the vibration dampener of FIG. 1.
Figure 4:
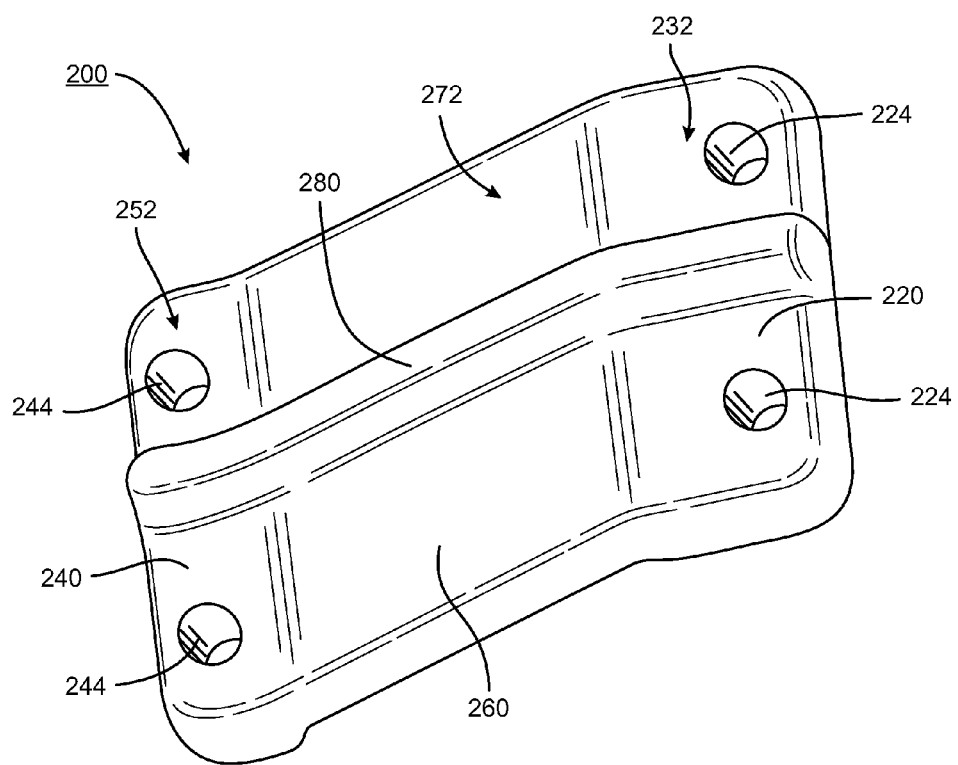
FIG. 4 is a side perspective view of the vibration dampener of FIG. 1.

Referring to FIG. 2-4 with continuing reference to FIG. 1, the vibration dampening braces 200 include a first flange member 220, a second flange member 240, a connecting member 260, and a rib 280. The connecting member 260 extends between the first and second flange members 220 and 240 to connect the flange members 220 and 240. The rib 280 extends from the outer surfaces 232, 252, and 272 of the first flange member 220, second flange member 240, and connecting member 260, respectively, substantially perpendicular to the surfaces 232, 252, and 272. The rib 280 is configured to provide structural support between the first and second flange members 220 and 240 to supplement the stiffness of the vibration dampening brace 200.

In the illustrated embodiment, each of the first and second flange members 220, 240 each include two apertures 224 and 244, respectively. Apertures 224 are configured to enable a securing member 228, for example a bolt, to pass through the aperture 224 and into a threaded hole formed in the housing base 128 to affix the first flange member 220 to the housing base 128. Likewise, apertures 244 are configured to enable a securing member 248 to pass through the aperture 244 and into a threaded hole formed in the mounting plate 144 to affix the second flange member 240 to the mounting plate 144. In other embodiments, more or fewer apertures and securing members can be used to affix the vibration dampening brace to the housing base and mounting plate. In yet another embodiment, the vibration dampening brace does not include apertures, but is affixed to the housing and mounting plate by other methods, such as welding, for example.

As illustrated in FIG. 3, an interior surface 236 of the first flange member 220 is curved. The curvature of the interior surface 236 is configured to match a curvature of the housing base 128 to enable the first flange member 220 to mount securely to the housing base 128. Likewise, the interior surface 256 of the second flange member 240 is curved to match a curvature of the mounting plate 144 to enable the second flange member 240 to mount securely to the mounting plate 144.

When a vibration issue is discovered in a vertically mounted motor, such as motor system 100, the vibration dampening braces 200 are installed between the housing base 128 and the mounting plate 144 to alter the stiffness, and thus the RCF, of the motor system 100. Each vibration dampening brace 200 of the illustrated embodiment is installed by placing the vibration dampening brace 200 against the motor housing 120 and mounting plate 144. Holes are drilled into the motor housing 120 and mounting plate 144, using the apertures 224 and 244 in the vibration dampening brace 200 as guide holes. The holes in the motor housing 120 and mounting plate 144 are tapped to enable securing members 248 to be inserted through the apertures 224 and 244 into the holes in the motor housing 120 and mounting plate 144, respectively, to secure the vibration dampening brace 200 to the motor housing 120 and mounting plate 144. As noted above, any suitable number of securing members can be used to affix the vibration dampening brace to the housing base and mounting plate. In other embodiments, the vibration dampening brace is affixed to the housing and mounting plate by other methods, such as welding, for example.

Providing the vibration dampening braces 200 on the motor system 100 serves to stiffen the bending moment of the motor stand 140 and the lower part of the motor housing 120. In response to the stiffened bending moment, the fixed supports 148 of the motor stand 140 bend less with the vibrations, altering the RCF of the system. The critical frequency is altered by a predetermined amount to ensure that the RCF of the system is outside the range of vibration frequencies, avoiding amplification of the system vibrations. Although FIG. 1 illustrates a system having four vibration dampening braces spaced substantially equally around the motor housing 120 and motor stand 140, any suitable number of vibration dampening braces can be installed on a motor in other embodiments at any suitable spacing. Mounting additional vibration dampening braces to the motor system 100 increases the stiffness of the motor system 100, further altering the RCF.

Figure 5:
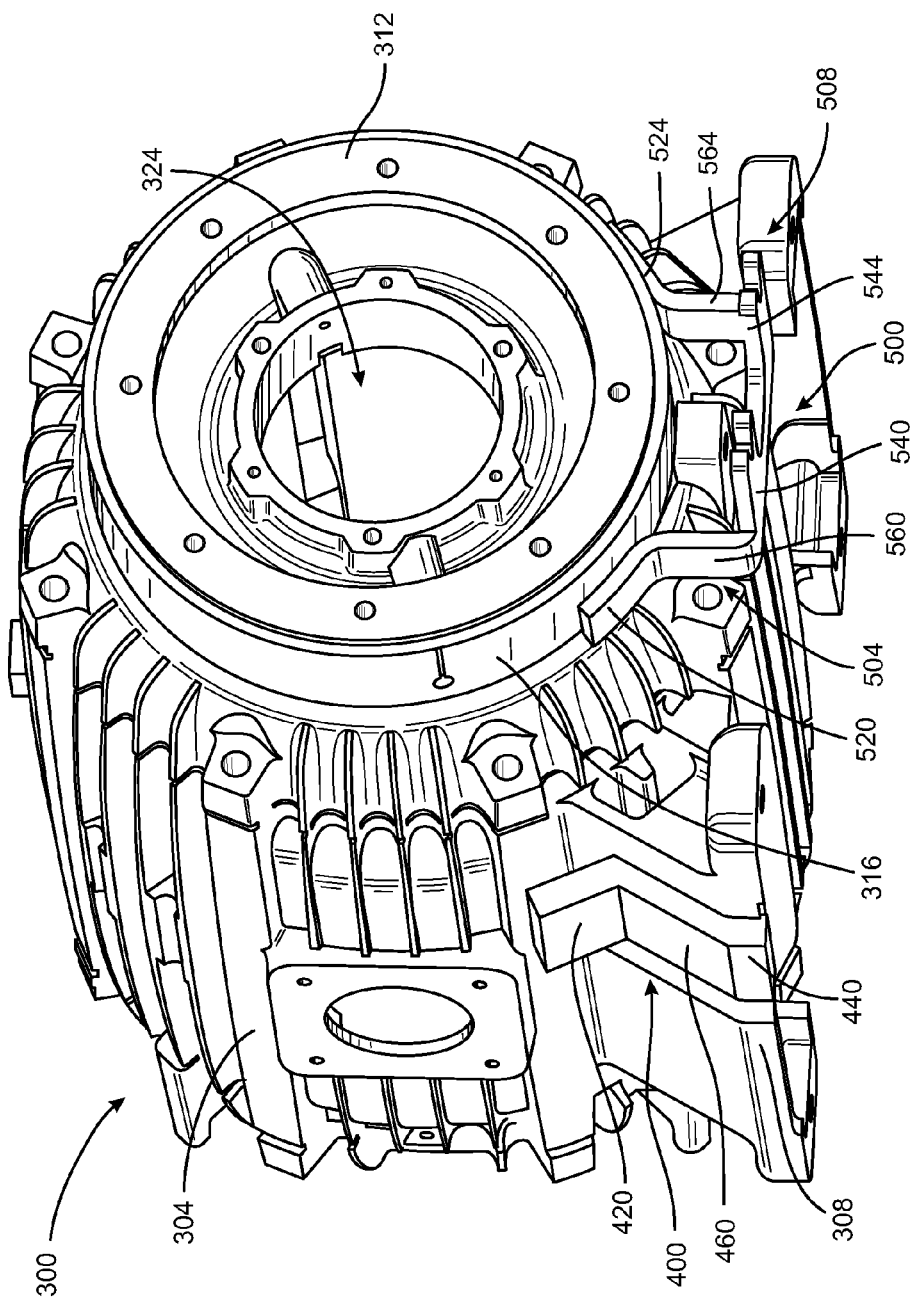
FIG. 5 is a side perspective view of an electrical motor housing including two embodiments of a vibration dampener.

FIG. 5 depicts an electrical motor housing 300 configured to be mounted in a horizontal configuration, with no electrical motor shown in the housing for clarity. The electrical motor housing 300 includes a housing motor cover 304, two housing supports 308, and an end cap 312. The housing motor cover has a housing ring at a first end 316 that surrounds the end cap 312. The housing motor cover 304 and end cap 312 define a chamber 324 that is configured to accommodate an electrical motor (not shown) having an output shaft that extends out of the housing 300 through the end cap 312. The housing supports 308 are configured to secure the motor housing 300 and associated motor to a foundation, motor stand, or other mounting structure (not shown).

FIG. 5 depicts a first vibration dampening brace 400 and a second vibration dampening brace 500, each of which is configured to be installed on a horizontally oriented electrical motor housing, such as the housing 300 shown in FIG. 5. Although the embodiment of FIG. 5 illustrates both vibration dampening braces 400 and 500 as being installed on the motor housing, the reader should appreciate that the system can be operated with only one of the illustrated vibration dampening braces, or that the system can include more than one of either vibration dampening brace or more than one of both vibration dampening braces 400 and 500. The first vibration dampening brace 400 includes a first flange member 420, a second flange member 440, and a connecting member 460. The connecting member 460 is fixedly attached to both the first flange member 420 and second flange member 440, and extends between the first flange member 420 and the second flange member 440. The first flange member 420 is configured to be affixed to an exterior of the housing motor cover 304, while the second flange member 440 is configured to be affixed to one of the housing supports 308. In the illustrated embodiment, the connecting member 460 is positioned against the housing support 308. In some embodiments, however, the connecting member can be affixed to the housing support, while in other embodiments the connecting member can be positioned such that there is a gap between the connecting member and the housing support.

The second vibration dampening brace 500 includes a first brace portion 504 and a second brace portion 508. The first brace portion 504 includes a first flange member 520, a second flange member 540, and a first connecting member 560, while the second brace portion 508 includes a third flange member 524, a fourth flange member 544, and a second connecting member 564. The first flange member 520 is configured to be affixed to the housing ring 316, while the second flange member 540 is affixed to a supporting structure (not shown), such as a foundation, motor stand, or other structure on which the motor is mounted. Likewise, the third flange member 524 is affixed to the housing ring 316, while the fourth flange member 544 is affixed to the supporting structure. The second flange member 540 and fourth flange member 544 are connected, such that the first brace portion 504 and the second brace portion 508 form a single vibration dampening brace 500.

The first vibration dampening brace 400 and the second vibration dampening brace 500 operate in substantially the same manner as the vibration dampening brace 200 described above with reference to the vertically mounted motor. Providing the vibration dampening braces 400 or 500 on the motor housing 300 serves to stiffen the bending moment of the motor and motor housing 300. In response to the stiffened bending moment, the housing moves less with the vibrations generated by the motor, altering the RCF of the system. The critical frequency is altered by a predetermined amount to ensure that the RCF of the system is outside the range of vibration frequencies, avoiding amplification of the system vibrations.

The first vibration dampening brace 400 and the second vibration dampening brace 500 can be affixed to the motor housing 300 and/or the support structure (not shown) in any suitable manner. For example, the flanges of the vibration dampening braces 400 or 500 can be attached by inserting a threaded member through an aperture in the flange, or the flanges can be welded to the housing or support structure.

Figure 6:
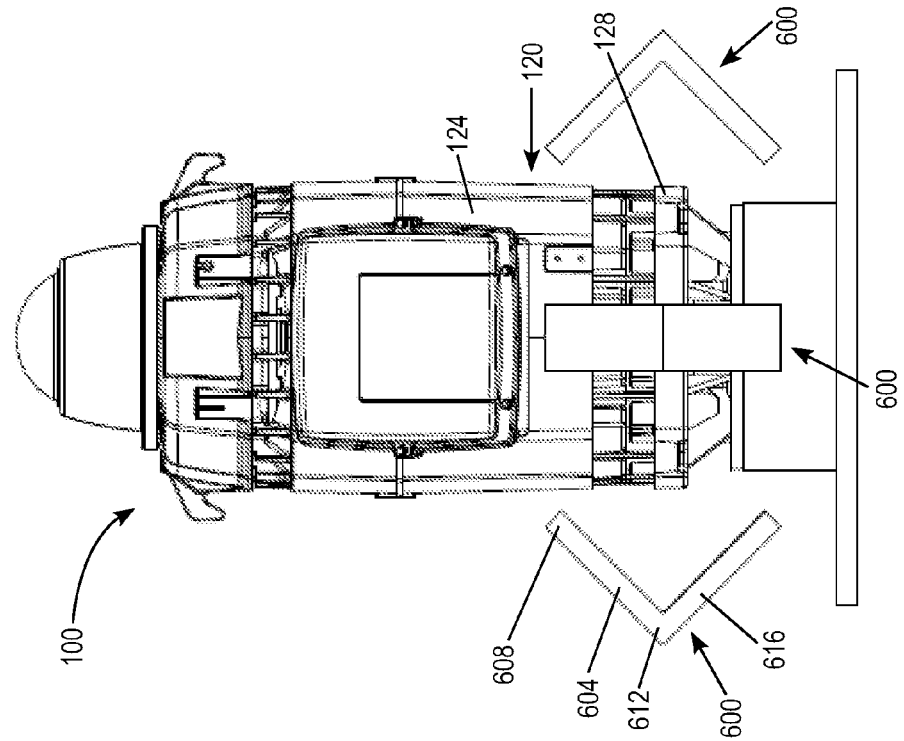
FIG. 6 is a side view of a motor system having another embodiment of a vibration dampener.
Figure 7:
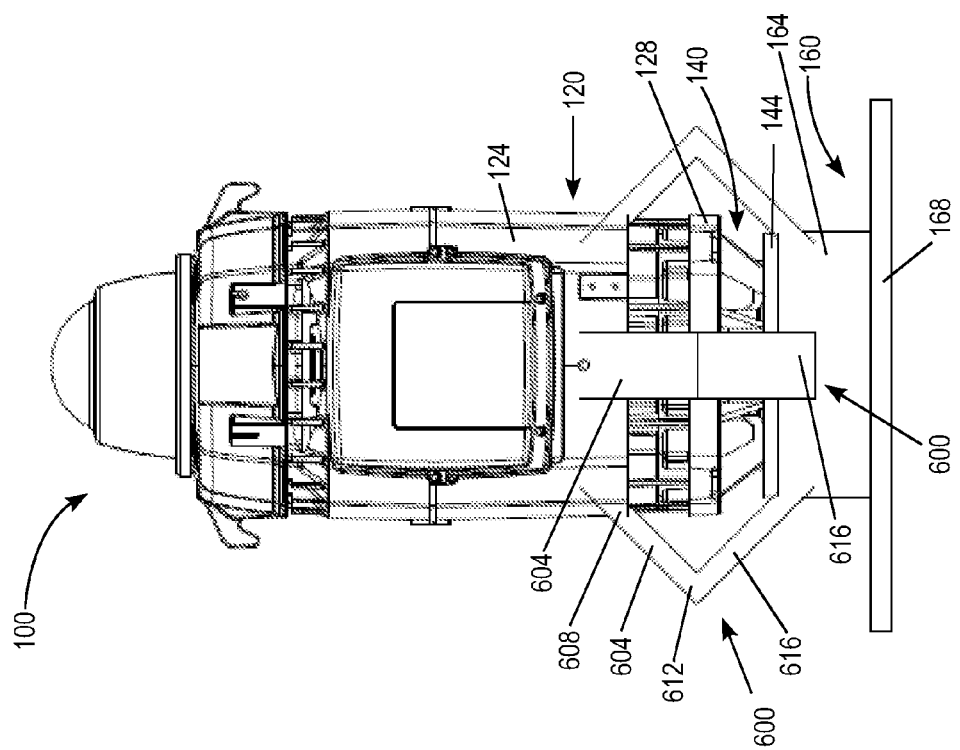
FIG. 7 is a partially exploded side view of the motor system and vibration dampeners of FIG. 6.

FIGS. 6 and 7 illustrate an electric motor system 100 having another embodiment of a vibration dampening brace 600. The vibration dampening brace 600 includes a first elongated member 604, which has a first end 608 and a second end 612, and a second elongated member 616. The second elongated member 616 is attached to the second end 612 of the first elongated member 604, and is substantially perpendicular to the first elongated member 604. In some embodiments, the first and second elongated members 604, 616 are arranged with respect to one another at an angle that is less than or greater than 90 degrees.

In the illustrated embodiment, the first end 608 of the first elongated member 604 is affixed to the exterior of the motor cover 124 of the motor housing 120. In other embodiments, the first elongated member 604 is configured to attach to any suitable portion of the motor housing 120. The second elongated member 616 is attached to a raised portion 164 of a working device 160 to which the motor 100 is mounted and configured to supply rotational energy to. In other embodiments, the second elongated member 616 can be attached to another supporting fixture, for example a support plate 168 of the working device 160. The first and second elongated members 604, 616 can be attached to the housing 120 and working device 160 in any suitable manner, for example with a fastener or by welding. In the illustrated embodiment, the first and second elongated members 604, 616 are integrally formed of a single piece of material, while in other embodiments the first and second members are two distinct pieces welded or fastened together.

Figure 9:
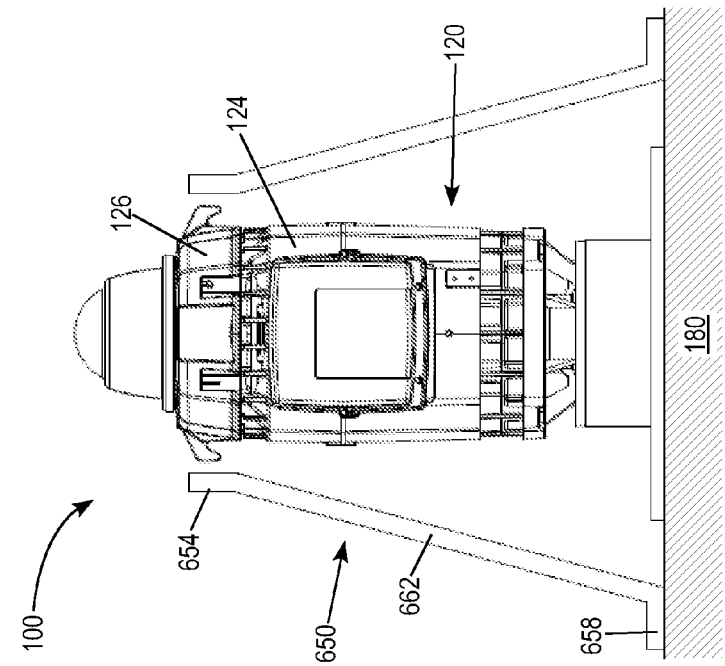
FIG. 9 is a partially exploded side view of the motor system and vibration dampeners of FIG. 8.
Figure 8:
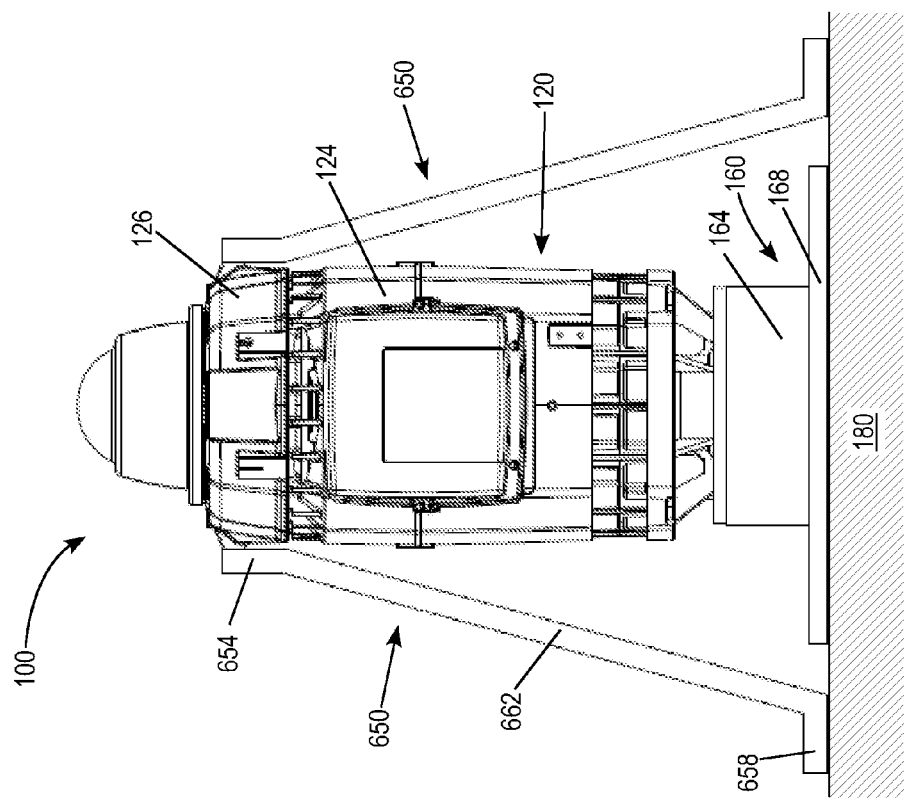
FIG. 8 is a side view of a motor system having yet another embodiment of a vibration dampener.

FIGS. 8 and 9 illustrate another embodiment of a vibration dampening brace 650 for the electric motor system 100. The vibration dampening brace 650 includes a first member 654, a second member 658, and an intermediate third member 662. In the illustrated embodiment, the first member 654 is configured to attach to an upper portion 126 of the cover 124 of the housing 120, though in other embodiments the first member 654 is attached to another portion of the housing 120. In the illustrated embodiment, the second member 658 engages the foundation 180 on which the motor 100 is supported, while in other embodiments, the second member 658 is attached to the support plate 168 of the working device 160, to the ground proximate the electrical motor system 100, or to another supporting fixture.

The third member 662 extends between the first and second members 654, 658 to connect the first and second members 654, 658 and enable vibrations generated by the motor to be transferred from the motor housing 120 to the second member 658 and thereafter to the foundation 180. The third member 662 also serves to stiffen the bending moment of the motor 100 and motor housing 120 by providing additional lateral support for the upper portion of the electrical motor housing 120. In response to the stiffened bending moment, the housing moves less with the vibrations generated by the motor, altering the RCF of the system. The critical frequency is altered by a predetermined amount to ensure that the RCF of the system is outside the range of vibration frequencies, avoiding amplification of the system vibrations.

Figures 10, 11:
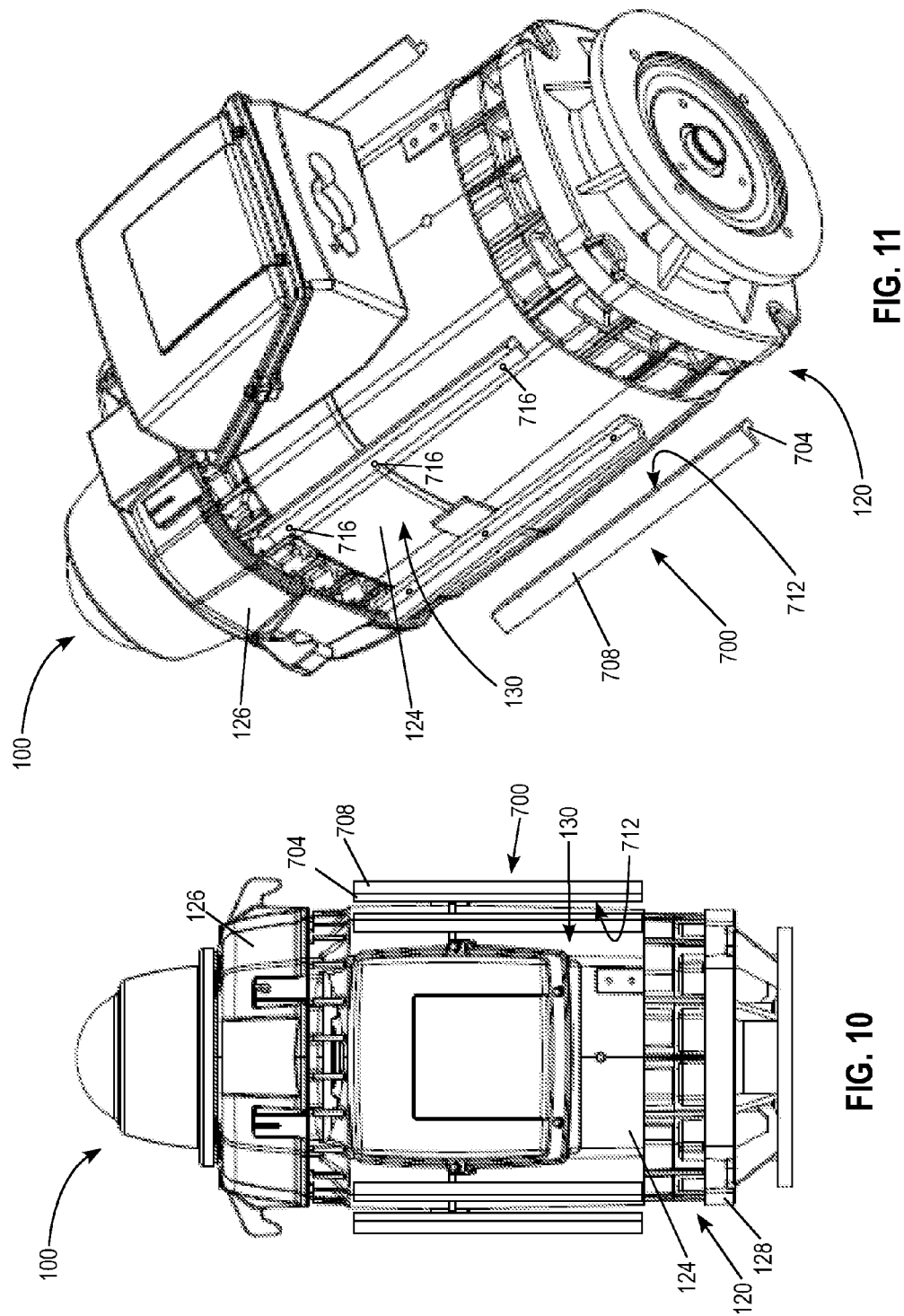
FIG. 10 is a side view of a motor system having another embodiment of a vibration dampener.
FIG. 11 is a partially exploded side perspective view of the motor system and vibration dampeners of FIG. 10.

FIGS. 10 and 11 illustrate another embodiment of a vibration dampening brace 700 for the electric motor system 100. The vibration dampening brace includes a first elongated flange member 704 and a second elongated flange member 708. The first elongated flange member 704 has a surface 712 configured to rest against an exterior surface 130 of the motor cover 124 of the motor housing 120. The first elongated flange member 704 further includes a plurality of apertures 716 extending through the first elongated flange member 704 to enable fasteners to be inserted through the first elongated flange member 704 and into the electric motor housing 120 to affix the vibration dampening brace 700 to the motor housing 120. The second elongated flange member 708 extends in a direction away from the first elongated flange member 704. In the illustrated embodiment, the first and second elongated flange members 704, 708 are planar and are substantially perpendicular to one another, though in other embodiments the shape of the first and second elongated members and the angle formed with respect to one another is different. Additionally, in some embodiments, the first elongated flange member does not include apertures, and is instead affixed to the electric motor housing by another suitable method, for example welding at various points along the first elongated flange member or along the entire length of the first elongated flange member.

Attaching the vibration dampening braces 700 to the exterior surface 130 of the motor housing 120 alters the weight distribution of the electric motor 100 and stiffens the bending moment of the motor 100 and motor housing 120. In response to the stiffened bending moment, the housing moves less with the vibrations generated by the motor, altering the RCF of the system. The critical frequency is altered by a predetermined amount to ensure that the RCF of the system is outside the range of vibration frequencies, avoiding amplification of the system vibrations.

Figure 13:
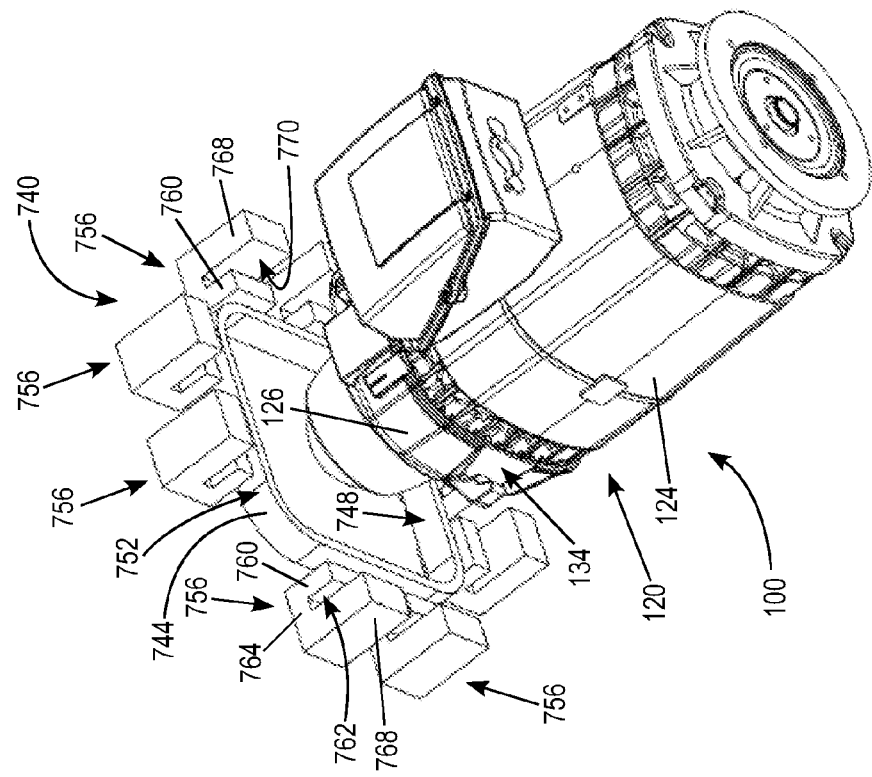
FIG. 13 is a partially exploded side perspective view of the motor system and vibration dampening system of FIG. 12.
Figure 12:
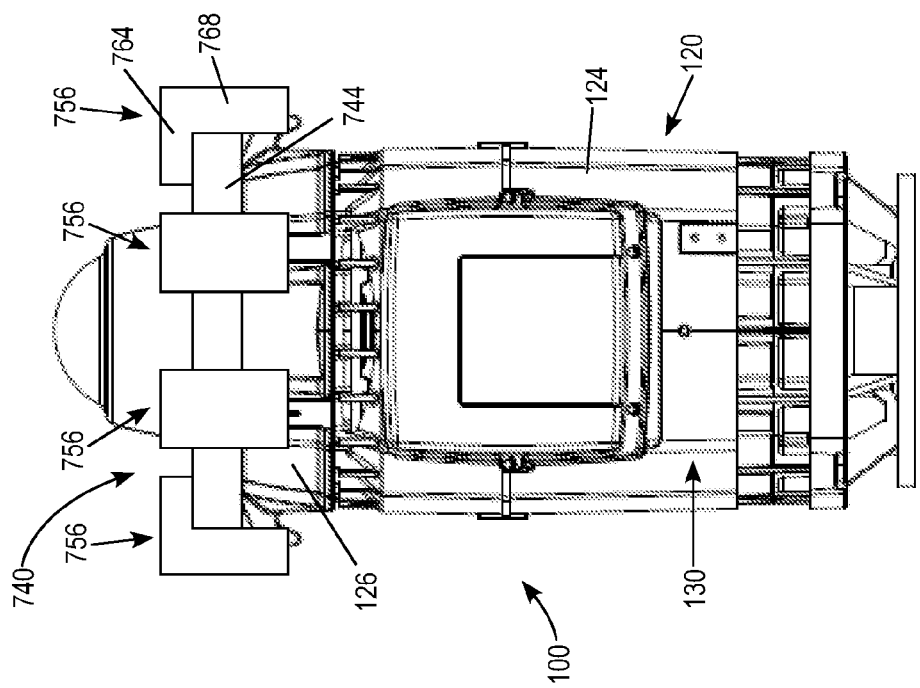
FIG. 12 is a side view of a motor system having another embodiment of a vibration dampening system.

FIGS. 12 and 13 illustrate a vibration dampening system 740 for the electric motor 100 system. The vibration dampening system 740 includes a support member 744 and a plurality of U-shaped members 756. The support member 744 is shaped as a substantially rectangular ring having rounded corners. In other embodiments, the support member has another shape that is suitable to engage the exterior of the motor housing 120. The support member 744 includes an inner surface 748 defining an inner perimeter and an outer surface 752 defining an outer perimeter. The support member 744 is configured to slide over the top of the motor housing 120 to a predetermined position, at which the inner perimeter 748 engages the outer surface 134 of the upper portion 126 of the motor cover 124 of the motor housing 120. In some embodiments, the support member 744 is then affixed to the housing, while in other embodiments, the support member rests on the housing but is not affixed to the housing. Additionally, in some embodiments, members that are not U-shaped are affixed to the support member, for example members having a rectangular prism shape, a cube shape, or any other suitable shape.

The U-shaped members 756 each include an inner flange 760, an outer flange 768, and a connecting portion 764. The inner flange 760 includes an inner surface 762 configured to engage the inner surface 748 of the support member 744, while the outer flange 768 includes an outer surface 770 configured to engage the outer surface 752 of the support member 744. In the illustrated embodiment, the inner flange 760 is smaller than the outer flange 768, though in other embodiments the flanges are the same size or the inner flange is larger than the outer flange. The distance between the inner flange 760 and the outer flange 768 is configured to be substantially identical to the width of the support member 744 to enable the U-shaped members 744 to hook onto the support member 744.

In the embodiment of FIGS. 12 and 13, eight U-shaped members are attached to the support member 744, though in other embodiments any suitable number of U-shaped members can be attached to the support member. In some embodiments, the U-shaped members 756 are welded or fastened to the support member 744, while in other embodiments the U-shaped members hang on the support member without being affixed to the support member.

Attaching the vibration dampening system 740 to the exterior of the motor housing 120 alters the weight distribution of the electric motor system 100. The altered weight distribution modifies the RCF of the system by a predetermined amount to ensure that the RCF of the system is outside the range of vibration frequencies, avoiding amplification of the system vibrations.

FIGS. 14 and 15 illustrate another embodiment of a vibration dampening brace 800 for the electric motor system 100. The vibration dampening brace 800 is shaped substantially as a trapezoidal prism having an upper surface 804 and a lower surface 820. The upper surface 804 has a first end 808 and a second end 812, and the lower surface 820 also has a first end 824 and a second end 828.

The first ends 808, 824 are separated by a distance that is less than a distance separating the second ends 812, 828, and the distance between the first ends 808, 824 is less than a distance between the upper surface of the mounting plate 144 and the lower surface of the housing base 128 of the housing 120 of the electrical motor 100. As such, the first ends 808, 824 are configured to fit between the mounting plate 144 and the housing base 128. The distance between the second ends 812, 828 is slightly greater than the distance between the upper surface of the mounting plate 144 and the lower surface of the housing base 128 of the housing 120, such that as the vibration dampening brace 800 is inserted into the space between the mounting plate 144 and the housing base 128, the upper surface 804 engages the housing base 128 and the lower surface 820 engages the mounting plate 144. Once the first and second surfaces 804, 820 of the vibration dampening brace 800 are in contact with the housing base 128 and the mounting plate 144, the vibration dampening brace 800 provides additional support that stiffens the bending moment of the motor 100 and motor housing 120. In response to the stiffened bending moment, the housing moves less with the vibrations generated by the motor, altering the RCF of the system. The critical frequency is altered by a predetermined amount to ensure that the RCF of the system is outside the range of vibration frequencies, avoiding amplification of the system vibrations.

While the embodiment shown in FIGS. 14 and 15 illustrates the inner and outer surfaces of the vibration dampening brace 800 as parallel to one another, the reader should appreciate that the inner and outer surfaces can be arranged at any suitable angle or are of any suitable shape. In some embodiments, the vibration dampening brace includes an aperture 840 configured to enable a fastener (not shown) to be inserted through the aperture from the outside surface to the inside surface and into a portion of the electric motor 100 to secure the vibration dampening brace 800 to the electric motor 100. In other embodiments, the vibration dampening brace is affixed to the housing and the mounting plate by other methods, for example welding to one or both of the housing and the mounting plate.

The vibration dampening braces disclosed herein are configured to stiffen the bending moment of the electrical motor housing. Since the bending moment of the electrical motor housing is stiffened, the housing moves less due to the vibrations generated by the combined system (motor assembly plus driven equipment), altering the RCF of the motor, which modifies the RCF of the combined system. The vibration dampening braces are configured to alter the RCF of the motor system by a predetermined amount so that the RCF of the combined system is outside the range of vibration frequencies generated by the combined system, thereby avoiding amplification of the vibrations generated by the combined system.

The reader should appreciate that the various vibration dampening braces described herein can be suitably mounted via screws, bolts, welding, or other suitable mounting mechanism to any number of different structures on the motor housing or the motor support structure to alter the RCF of the motor system, as long as the vibration dampening brace alters the stiffness of the motor system and alters the RCF of the motor system to reduce vibrations in the system.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A vibration dampener for an electrical motor comprising:
   a member configured to engage an electrical motor housing and a mounting plate, the member being a trapezoidal prism having:
   a first surface configured to engage a surface of the electrical motor housing; and
   a second surface configured to engage the mounting plate, each of the first and second surfaces having first and second ends, the first ends of the first and second surfaces being located at a first side of the member and being closer to one another than the second ends of the first and second surfaces, which are located at a second side of the member, the first ends of the first and second surfaces being separated by a distance that is less than a distance between the electrical motor housing and the mounting plate and the second ends of the first and second surfaces being separated by a distance that is greater than the distance between the electrical motor housing and the mounting plate to enable the first ends of the first and second surfaces of the member to be inserted into a space between the electrical motor housing and the mounting plate until a portion of the member proximate the second ends of the first and second surfaces is wedged into contact with the electrical motor housing and the mounting plate to stiffen the bending moment of the electrical motor housing and modify a resonance frequency of the electrical motor.

2. The vibration dampener of claim 1, the member further comprising:
   an aperture extending through the member to enable the member to be affixed to the electrical motor housing after the second ends of the first and second surfaces are wedged into contact with the electrical motor housing and the mounting plate.

* * * * *